No. 79,509.  
PATENTED JUNE 30, 1868.  
N. SMITH.  
GUIDE FOR SCREWS.

Witnesses:  
Theo. G. Ellis  
Zalmon A. Storrs

Inventor:  
Norman Smith

United States Patent Office.

NORMAN SMITH, OF HARTFORD, CONNECTICUT.

Letters Patent No. 79,509, dated June 30, 1868.

IMPROVEMENT IN GUIDES FOR SCREWS.

The Schedule referred to in these Letters Patent and making part of the same.

TO ALL WHOM IT MAY CONCERN:

Be it known that I, NORMAN SMITH, of Hartford, in the county of Hartford, and State of Connecticut, have invented a new and useful Guide for Starting Screws; and I do hereby declare that the following is a full, clear, and exact description thereof, whereby a person skilled in the art can make and use the same, reference being had to the accompanying drawings, and to the letters of reference marked thereon.

Figure 2:
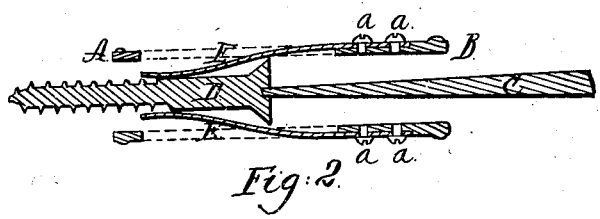
Figure 2 shows a vertical longitudinal section of the same, together with a screw and screw-driver.

My invention has for its object the holding of a screw on to the end of a screw-driver, in the proper position for turning, in order to guide it into the desired object without holding the screw with the hand.

My invention consists in providing a short tube with interior side springs of such a form that they clasp the shank of the screw and hold it in place, while the tube is supported by the screw-driver, thus holding the whole together with sufficient firmness to admit of the screw being turned into wood without other support.

A B is the tube or shell, E E are the springs for clasping the screw D. They pass through openings in the tube, and are attached to it by male screws $a$ $a$, as shown in the drawings.

C is a screw-driver, which should nearly fit the tube A B. D is a screw inserted into the guide, and ready to be screwed into any desired object.

Figure 3:
Figure 3 shows an end view at the end A of the tube.
Figure 1:
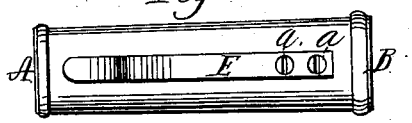
Figure 1 shows a top view of the guide.
Figure 4:
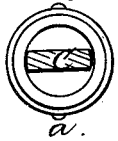
Figure 4 shows an end view at the end B of the tube.

The springs E E are made with the ends which clasp the screw of a curved form, as shown in fig. 3, to fit around the shank of the screw. These springs, when the guide is not in use, come nearly together within the tube, and are forced apart when the screw is inserted.

The operation of my invention, when in use, is as follows:

The screw-driver is placed in the slot of the screw, and the guide is then slipped over the end of the screw to the position shown in fig. 2. The screw-driver is then taken by the handle, and the screw directed to the point desired and screwed in as usual.

When the screw is inserted as far as the end A of the tube, the head is drawn through the tube by continuing to turn, and passes under the springs E E, which yield to permit it to pass, leaving the guide upon the blade of the screw-driver; or, after taking a few turns with the screw to hold it, the screw-driver can be taken out and the guide drawn off over the head of the screw, after which the screw can be turned in as usual.

My invention permits screws to be inserted in any place which can be reached with the end of the screw-driver, and in places which would be inaccessible by the usual method of holding the screw with one hand and the screw-driver in the other.

Claim.

What I claim as my invention, and desire to secure by Letters Patent, is—

The combination of the tube A B and two or more springs E, for the purpose of a guide for starting screws, substantially as herein specified.

NORMAN SMITH.

Witnesses:
THEO. G. ELLIS,
ZALMON A. STORRS.